(12) United States Patent
A R et al.

(10) Patent No.: US 11,734,584 B2
(45) Date of Patent: Aug. 22, 2023

(54) MULTI-MODAL CONSTRUCTION OF DEEP LEARNING NETWORKS

(71) Applicant: International Business Machines Corporation, Armonk, NY (US)

(72) Inventors: Rahul A R, Bangalore (IN); Neelamadhav Gantayat, Bangalore (IN); Shreya Khare, Bangalore (IN); Senthil K K Mani, Bangalore (IN); Naveen Panwar, Bangalore (IN); Anush Sankaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 15/491,162

(22) Filed: Apr. 19, 2017

(65) Prior Publication Data
US 2018/0307978 A1    Oct. 25, 2018

(51) Int. Cl.
*G06N 5/04* (2023.01)
*G06N 3/10* (2006.01)
(Continued)

(52) U.S. Cl.
CPC .............. *G06N 5/04* (2013.01); *G06F 30/20* (2020.01); *G06N 3/105* (2013.01); *G06N 5/022* (2013.01); *G06F 2111/10* (2020.01)

(58) Field of Classification Search
CPC .......... G06N 5/04; G06N 5/022; G06F 30/20; G06F 2111/10
See application file for complete search history.

(56) References Cited

U.S. PATENT DOCUMENTS

2004/0044990 A1* 3/2004 Schloegel ................. G06F 8/34
                                                        717/113
2007/0169039 A1* 7/2007 Lin .......................... G06F 8/34
                                                        717/146
(Continued)

FOREIGN PATENT DOCUMENTS

WO    2014137892 A1    9/2014

OTHER PUBLICATIONS

Senyard et al., "Software Engineering Methods for Neural Networks," 10th Asia-Pacific Software Eng'g Conf (2003) (Year: 2003).*

(Continued)

*Primary Examiner* — Kakali Chaki
*Assistant Examiner* — Kevin L. Smith
(74) *Attorney, Agent, or Firm* — Ryan, Mason & Lewis, LLP

(57) ABSTRACT

Methods, systems, and computer program products for multi-modal construction of deep learning networks are provided herein. A computer-implemented method includes extracting, from user-provided multi-modal inputs, one or more items related to generating a deep learning network; generating a deep learning network model, wherein the generating includes inferring multiple details attributed to the deep learning network model based on the one or more extracted items; creating an intermediate representation based on the deep learning network model, wherein the intermediate representation includes (i) one or more items of data pertaining to the deep learning network model and (ii) one or more design details attributed to the deep learning network model; automatically converting the intermediate representation into source code; and outputting the source code to at least one user.

20 Claims, 14 Drawing Sheets

(51) Int. Cl.
  *G06N 5/022* (2023.01)
  *G06F 30/20* (2020.01)
  *G06F 111/10* (2020.01)

(56) References Cited

U.S. PATENT DOCUMENTS

| | | | | |
|---|---|---|---|---|
| 2014/0365504 | A1* | 12/2014 | Franceschini | G06N 5/046 |
| | | | | 707/748 |
| 2015/0339572 | A1* | 11/2015 | Achin | G06N 20/00 |
| | | | | 706/46 |
| 2016/0098646 | A1* | 4/2016 | Gomez | G06N 20/00 |
| | | | | 706/12 |
| 2016/0267396 | A1* | 9/2016 | Gray | G06N 20/00 |
| 2016/0328644 | A1* | 11/2016 | Lin | G06N 3/084 |
| 2017/0262737 | A1* | 9/2017 | Rabinovich | G06N 3/0454 |
| 2018/0005079 | A1* | 1/2018 | Tosic | G06N 7/005 |
| 2018/0136912 | A1* | 5/2018 | Venkataramani | G06F 8/35 |

OTHER PUBLICATIONS

Kannan et al., "Image Clustering and Retrieval using Image Mining Techniques," 2010 IEEE Int'l Conf. on Computational Intelligence & Computing Research (2010) (Year: 2010).*
Hall et al., A Graphical Framework for Constructing and Executing Computational Networks, (2010) (Year: 2010).*
Tokui et al., "Chainer: a Next-Generation Open Source Framework for Deep Learning," LearningSys (2015) (Year: 2015).*
Rastegar et al., "MDL-CW: A Multimodal Deep Learning Framework with Cross Weights," IEEE Conf. on Computer Vision & Pattern Recognition (2016) (Year: 2016).*
Van Veen, "The Neural Network Zoo," The Asimov Institute (2016) (Year: 2016).*
U.S. Appl. No. 62/423,446 to Venkataramani et al. (Year: 2016).*
"Software Verification," Wikipedia Jan. 1, 2017 (Year: 2017).*
LeCun et al., "Deep Learning," Nature (2015) (Year: 2015).*
Choudhury et al., "An Architecture for Information Extraction from Figures in Digital Libraries," Int'l World Wide Web Conference Committee (IW3C2) (2015) (Year: 2015).*
Choudhury et al., "Automatic Extraction of Figures from Scholarly Documents", DocEng (2015) (Year: 2015).*
Talib S. Hussain, "A Meta-Model Perspective and Attribute Grammar Approach to Facilitating the Development of Novel Neural Network Models," Meta-Learning in Computational Intelligence (2011) (Year: 2011).*
Szegedy et al., "Going Deeper with Convolutions," (2015) (Year: 2015).*
Heck et al., "Deep Learning of Knowledge Graph Embedding for Semantic Parsing of Twitter Dialogs," Global SIP (2014) (Year: 2014).*
Feng et al., "Learning the Structure of Deep Convolutional Networks," ICCV (2015) (Year: 2015).*
Doval et al., "Shallow Recurrent Neural Network for Personality Recognition in Source Code," (2016) (Year: 2016).*
Sharma et al., "Adapting Off-the-Shelf CNNs for Word Spotting & Recognition," ICDAR (2015) (Year: 2015).*
Szegedy et al., "Going Deeper with Convolutions," Chart Pack, CSE 5194 (2015) (Year: 2015).*
Tang, Y. TF.Learn: TensorFlow's High-level Module for Distributed Machine Learning, Distributed, Parallel, and Cluster Computing, Dec. 13, 2016.
Luo, G. PredicT-ML: A Tool for Automating Machine Learning Model Building with Big Clinical Data, Health Information Science and Systems, 2016.
Wikipedia, SPSS Modeler, https://en.wikipedia.org/w/index.php?title=SPSS_Modeler&oldid=769302860, Mar. 8, 2017.
IBM, IBM Watson Machine Learning, https://www.ibm.com/blogs/bluemix/2016/10/predictive-analytics-renamed-watson-machine-learning-service/, Oct. 25, 2016.
Wikipedia, Neuroph, https://en.wikipedia.org/w/index.php?title=Neuroph&oldid=712677203, Mar. 30, 2016.
Nvidia Digits, https://developer.nvidia.com/digits, Jan. 30, 2017.
Aetros, https://web.archive.org/web/20161002084158/http://aetros.com/, Oct. 2, 2016.

* cited by examiner

MULTI-MODAL CONSTRUCTION OF DEEP LEARNING NETWORKS

FIELD

The present application generally relates to information technology, and, more particularly, to deep learning networks.

BACKGROUND

Building deep networks commonly requires technical knowledge and coding skills. Existing network construction approaches can include the use of libraries, and such libraries can have different syntax and varying underlying programming languages. However, at the time of construction, if even one layer of a deep network is misplaced, using such existing approaches can preclude any valuable learning.

SUMMARY

In one embodiment of the present invention, techniques for multi-modal construction of deep learning networks are provided. An exemplary computer-implemented method can include extracting, from user-provided multi-modal inputs, one or more items related to generating a deep learning network, and generating a deep learning network model, wherein generating includes inferring multiple details attributed to the deep learning network model based on the one or more extracted items. The method also includes creating an intermediate representation based on the deep learning network model, wherein the intermediate representation comprises (i) one or more items of data pertaining to the deep learning network model and (ii) one or more design details attributed to the deep learning network model. Further, the method includes automatically converting the intermediate representation into source code, and outputting the source code to at least one user.

In another embodiment of the invention, an exemplary computer-implemented method can also include steps of creating a repository of multiple deep learning network models, retrieving a similar pre-existing deep learning network model from a repository based on a comparison of the one or more extracted items and the multiple deep learning network models stored in the repository, and creating an intermediate representation by adapting the retrieved pre-existing deep learning network to the user-provided multi-modal inputs, wherein the intermediate representation comprises (i) one or more items of data pertaining to the deep learning network model and (ii) one or more design details attributed to the deep learning network model.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes multi-modal construction of deep learning networks. At least one embodiment of the invention includes a cognitive system that can intelligently support fast and accurate designing of deep learning models. Such a system, by way merely of example, can be implemented by (and benefit) people with limited coding expertise, people with limited deep learning platform expertise, people with limited theoretical understanding of deep learning, etc. Additionally, such a system can take input in various formats (that is, multi-modal inputs) and automatically build a deep learning model, wherein the inputs can include images, natural language data, source code, research papers, etc.

At least one embodiment of the invention can include enabling a user to design and generate source code for a deep learning model via a drag and drop user interface (UI). To design a network using one or more embodiments of the invention, a user does not have to code or present any data information. Such an embodiment can include providing a visual user interface (for example, a drag and drop interface) to design deep learning models and directly generate code. Additionally, the techniques described herein are platform-agnostic.

Also, at least one embodiment of the invention can include automatically converting a deep learning model built in one platform to another platform, and performing static validation of the built model (that is, determining whether correct layers are present in the model, and whether those layers are in the correct sequence). One or more embodiments of the invention can also include identifying and correcting mistakes while a deep learning model is being built, using previously acquired knowledge. Such corrections can be made irrespective of the data used to train the model.

Figure 1:
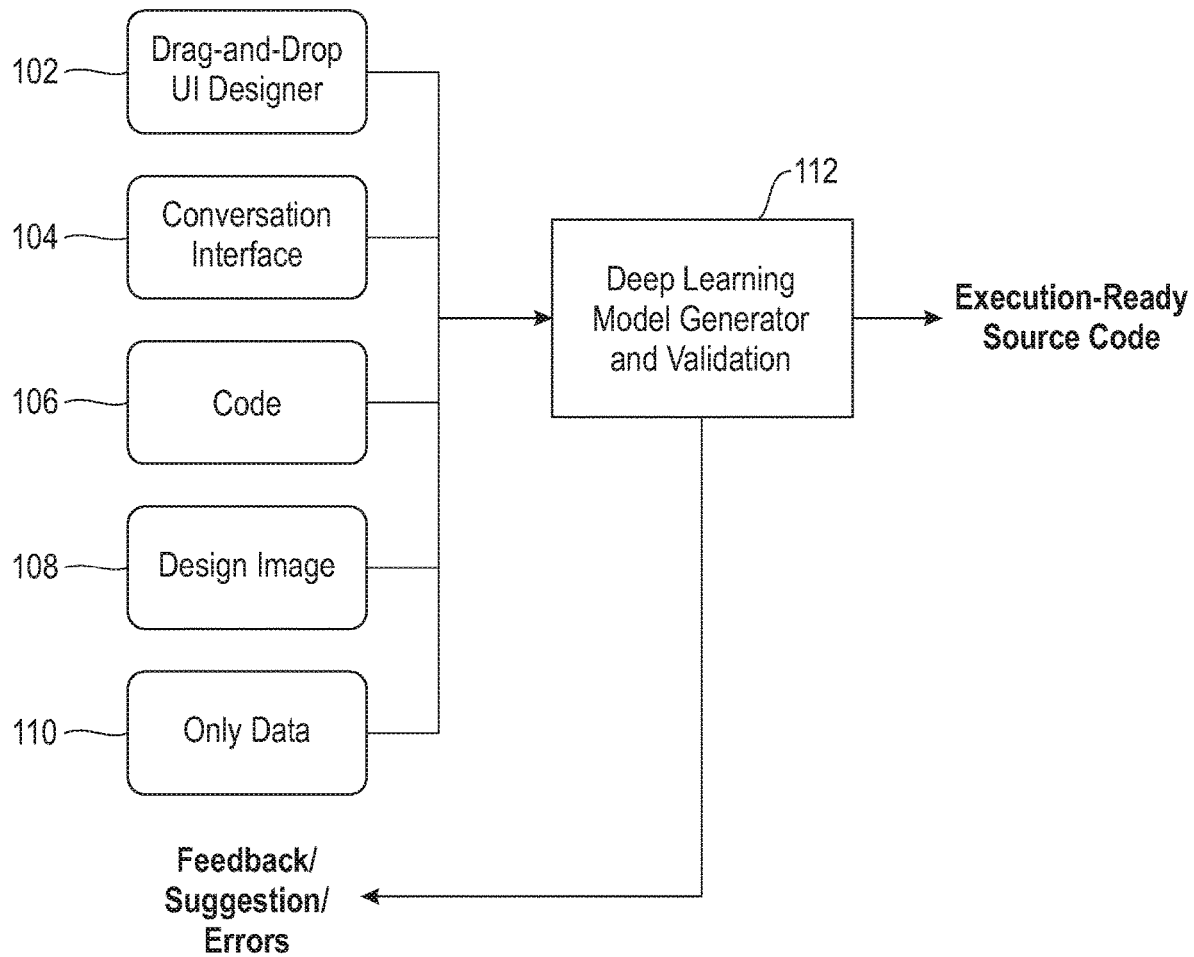
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a drag-and-drop user interface (UI) designer component 102, a conversation interface 104, a set of code 106, a design image 108, and a set of data (only data) 110, which are all provided to a deep learning model generator and validation component 112. The deep learning model generator and validation component 112, using the provided multi-modal inputs, generates execution-ready source code as well as feedback, suggestions, errors, etc., which can be based on previously acquired knowledge.

As further detailed herein, the deep learning model generator and validation component 112 can carry out deep learning platform interoperability, whereby the component is capable of converting deep learning code (and/or a deep learning model) written in one library to deep learning code in another library. In performing the above-noted conversion, the deep learning model generator and validation component 112 analyzes the deep learning code in a source library (any language, any syntax), and converts the source library code into the given intermediate representation. This can be carried out using a logic such as detailed in connection with FIG. 5. Additionally, the intermediate representation can then be converted into a code of the destination library language and syntax. Thus, conversion occurs from code in one library to code in another library, through the intermediate representation.

Accordingly, in one or more embodiments of the invention, a model designed in an existing platform can be imported to an intermediate representation and exported to another platform automatically. A developed intermediate representation for deep learning model designs can include, for example, both data and model design details.

Additionally, in one or more embodiments of the invention, if the user (attempting to generate the deep learning code) is a novice and/or uncertain in the necessary steps forward, and all he/she has are data, the deep learning model generator and validation component 112 can suggest (to the user) the type(s) of deep learning models that may work for the given dataset provided by the user.

Figure 2:
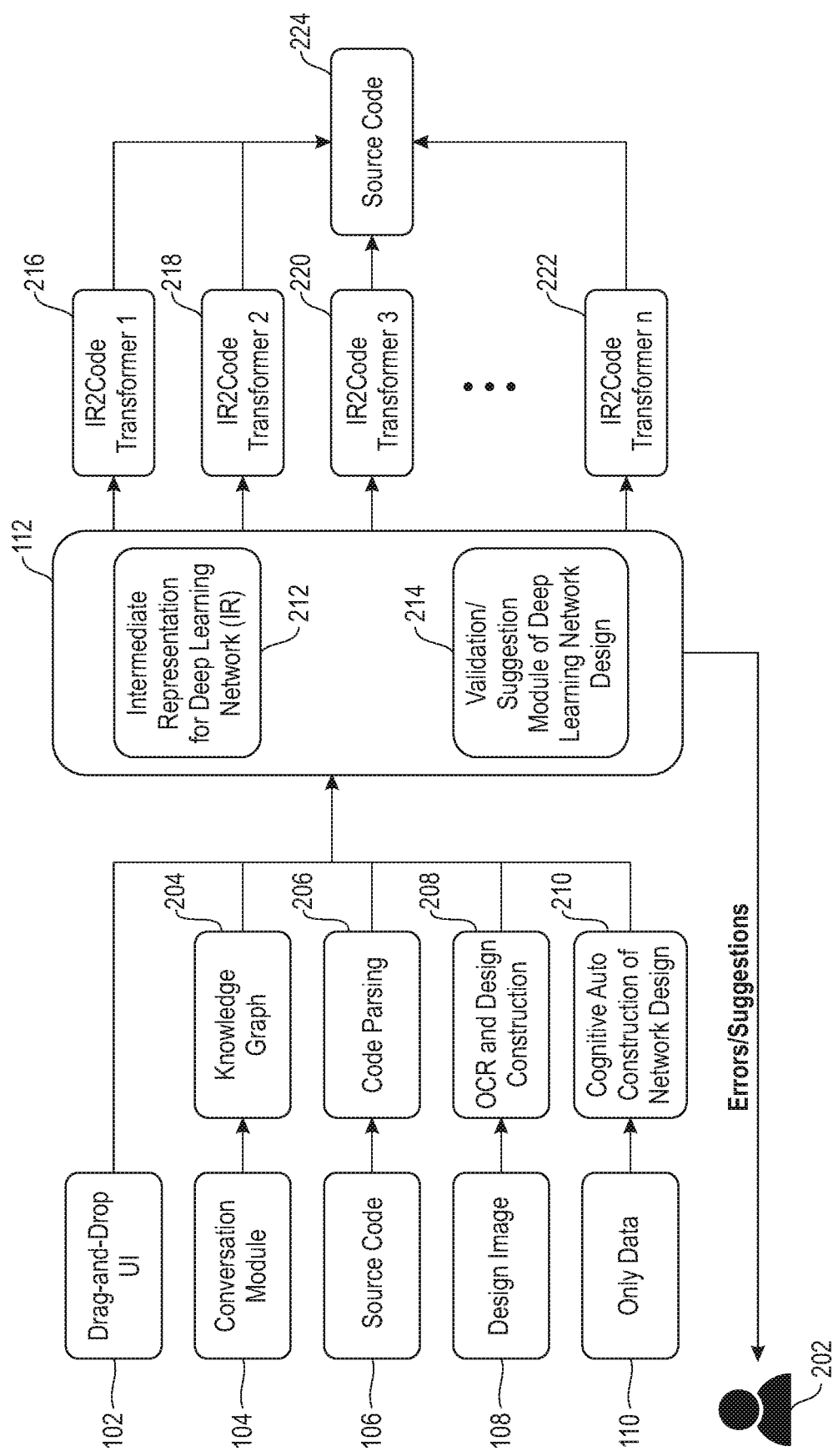
FIG. 2 is a diagram illustrating system architecture, according to an exemplary embodiment of the invention.

FIG. 2 is a diagram illustrating system architecture, according to an embodiment of the invention. By way of illustration, FIG. 2 illustrates how data from one or more input sources can be converted into an intermediate representation. For example, the conversation module 104 can query pertinent questions and gather information about the sought network from the user 202. The conversation module 104 can then use this information to construct an intermediate representation, for example, of a knowledge graph 204. Additionally, one or more embodiments of the invention include supporting pluggable transformers which convert source code such as code 106 from an intermediate representation (via a code parsing output 206, for example). The process of code parsing is further explained in connection with FIG. 5 (for example, via components 506, 508, 510, and 514). The output of such code parsing can include an abstract syntax tree (AST) data structure of the input source code, along with the entities and intentions in the code (deep learning layer name and definitions).

Also, at least one embodiment of the invention can include using shape detection and optical character recognition (OCR) to identify the type(s) of layers present in a design image 108, and creating a visual model representation in the form of an OCR and design construction output 208 based thereon. Output 208 includes the extracted text from the given image. From the text extracted, the design of the deep learning model is constructed, which is then converted into the intermediate representation. Such a visual model representation can then be converted into an intermediate representation.

Further, one or more embodiments of the invention include maintaining one or more repositories of valid and invalid models (created incrementally using mutations). In such an embodiment, given data 110, the closest matching model (to the given data 110) from the repository is identified and used as is or can be adapted (via cognitive auto construction of network design 210) to the given data 110. Such an adaptation can be carried out by re-training and updating the parameters of the identified model, using the given data. Additionally, the drag-and-drop UI designer 102, also referred to herein as a visual editor, can be used to create one or more deep learning networks.

As additionally depicted in FIG. 2, the deep learning model generator and validation component 112 can compile the intermediate representations (via component 212) and generate one or more insights and/or suggestions (via component 214) pertaining to the correctness of the network (and provide such outputs to the user 202). By way of example, component 214 can include and/or utilize a knowledge base with information regarding best practices, rules of construction and one or more heuristics. As component 112 trains more and more networks, the component can determine which network configurations work for certain inputs and which configurations do not work for certain inputs. Over time, such a learning mechanism can improve and provide increasingly accurate validation and feedback.

Also, as noted herein, one or more embodiments of the invention can include providing interoperability. For example, based on the intermediate representations of component 212, code (such as code 224) for any library can be automatically generated. Such generation can include the user of a transformer (such as code transformers 216, 218, 220 and 222) for each library, and new transformers can be plugged-in dynamically at run-time. As used herein, an "IR2Code" transformer refers to an intermediate representation to code transformer.

Figure 3:
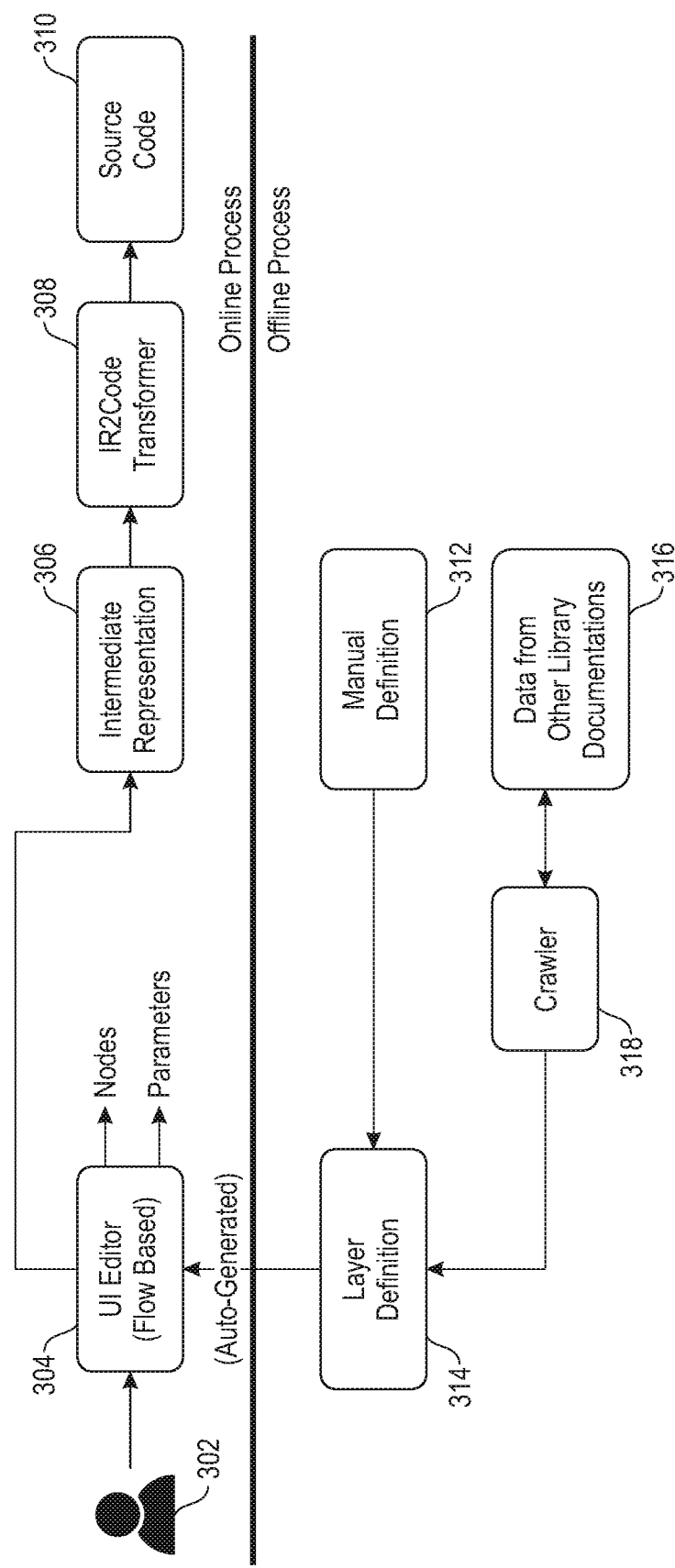
FIG. 3 is a diagram illustrating system architecture, according to an exemplary embodiment of the invention.

FIG. 3 is a diagram illustrating system architecture, according to an embodiment of the invention. By way of illustration, FIG. 3 depicts designing and source code generation of a deep learning network, including one or more parameters, with an intuitive drag-and-drop UI. Such parameters can include, for example, parameters that define each layer of a deep learning network. There are many kinds of layers in a deep learning network, and each layer can have its own parameters. For example, a dense layer can have, as parameters, (i) a number of nodes, (ii) an activation function, and (iii) a norm function.

Specifically, FIG. 3 depicts an offline process and an online process. In the offline process, a manual definition 312 (of the layer) is provided to a layer definition component 314, which also receives (via a crawler component 318) data from other library documentations 316. The layer definition can include, for example, the possible set of parameters of each layer, which can be manually defined. Additionally, there are certain websites which contain the layer definition of certain popular deep learning layers. For such instances, the crawler component 318 can be utilized to crawl the layer definition information.

The online process includes defining, based on the layer definition 314 provided by the offline process, a design flow of nodes (also referred to herein as layers), and the properties of each node, via a UI editor 304 upon engagement with a user 302. Such a design flow can then be generated as an intermediate representation 306, which is then provided to a code transformer 308, which generates and outputs source code 310.

Figure 4:
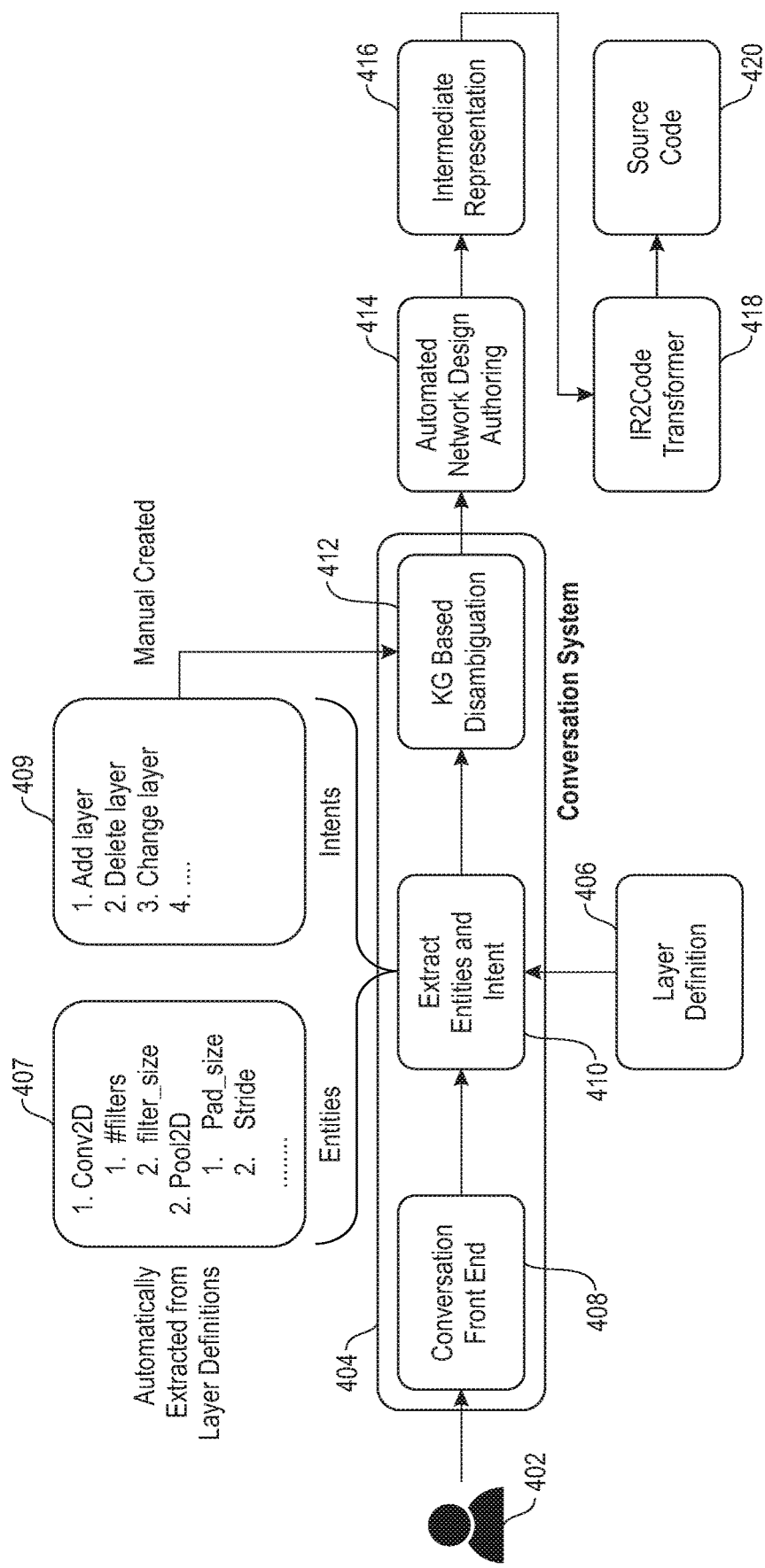
FIG. 4 is a diagram illustrating system architecture, according to an exemplary embodiment of the invention.

FIG. 4 is a diagram illustrating system architecture, according to an embodiment of the invention. By way of illustration, FIG. 4 depicts a system for automatically inferring details of a deep learning network model and generating the corresponding source code using a natural language conversation framework. In one or more embodiments of the invention, a knowledge graph (KG) is employed to disambiguate user intentions and to construct (better) models. For example, FIG. 4 depicts a conversation system 404, which includes a conversation front-end component 408, an entities and intentions extraction component 410, and a KG-based disambiguation component 412. Specifically, a user 402 engages with the conversation system 404 via the front-end component 408, and based on the user inputs (for example, the user can provide the entire deep learning network design as the input, wherein the design includes the sequence of layers used in the deep learning network as well as the parameters of each layer), the extraction component 410 can automatically extract a set of entities 407 from a related layer definition file 406, while a finite set of intentions 409 can be manually defined by the creator of the system. Using the extracted set of entities and intentions, a trained KG can be used (via component 412) to disambiguate the context in the conversation, from which the deep learning network flow can be ultimately generated.

Specifically, the output of the KG-based disambiguation component 412 of the conversation system 404 can be processed by an automated network design authoring component 414, and based thereon, an intermediate representation 416 can be generated and/or obtained. Specifically, the automated network design authoring component 414 analyzes all of the user inputs provided through the conversation and automatically creates the intermediate representation. Subsequently, the intermediate representation 416 can be provided to a code transformer 418, which generates and outputs source code 420.

Figure 5:
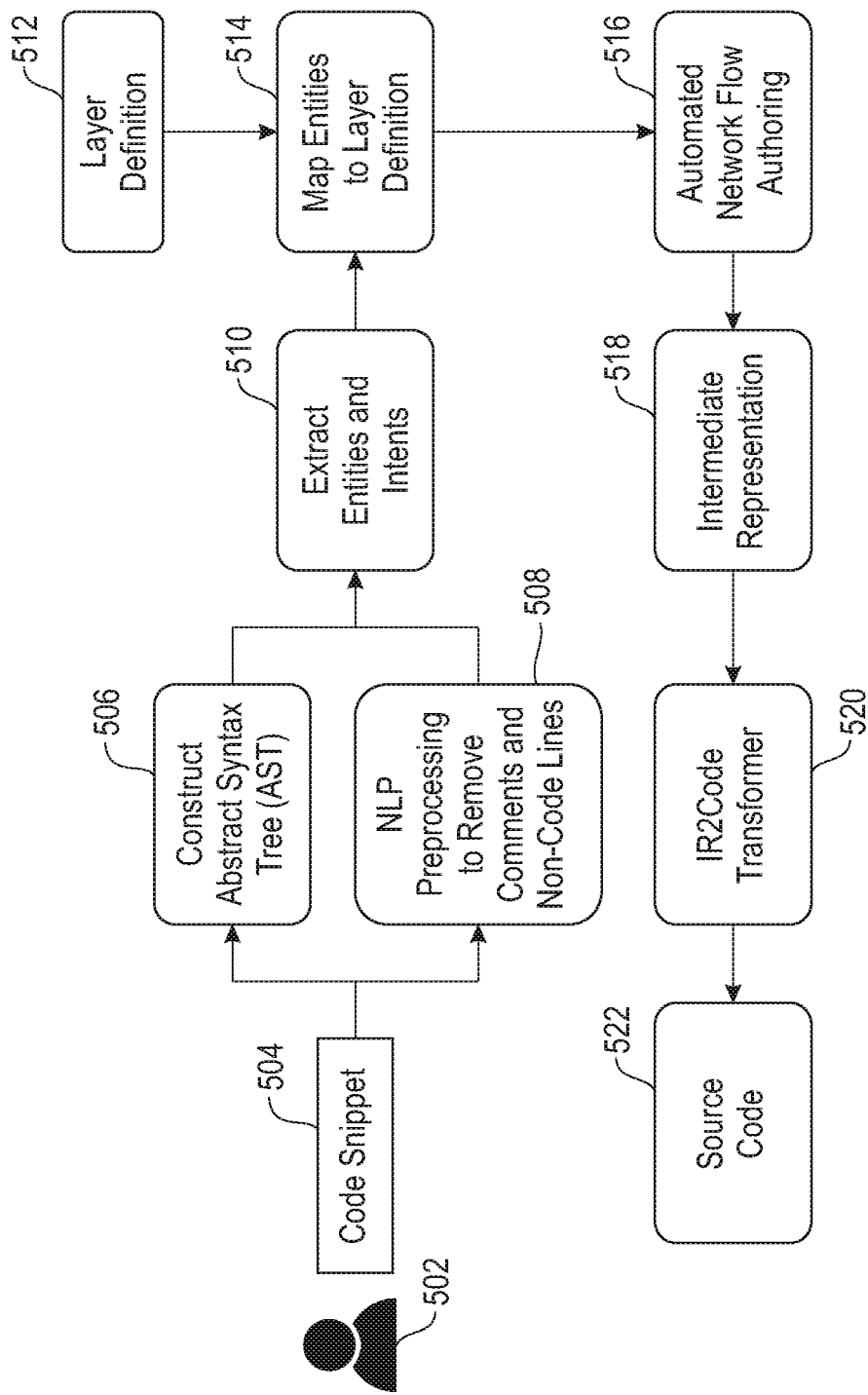
FIG. 5 is a diagram illustrating system architecture, according to an exemplary embodiment of the invention.

FIG. 5 is a diagram illustrating system architecture, according to an embodiment of the invention. By way of illustration, FIG. 5 depicts automatically inferring details and designing a model using an input source code snippet 504 written in any deep learning framework. Specifically, using the input source code snippet 504 provided by a user 502, comments and non-code lines can be removed via a natural language processing (NLP) component 508, and an AST can be extracted and constructed via component 506. Using the AST, entities and intentions can be extracted via component 510. Using pre-defined layer definitions 512, the extracted entities (as well as the extracted intentions) are mapped to the corresponding layer definition via component 514, and the entire network flow is generated via authoring component 516. From the generated network flow, an intermediate representation 518 can be provided to a code transformer 520, which generates and outputs source code 522.

Figure 6:
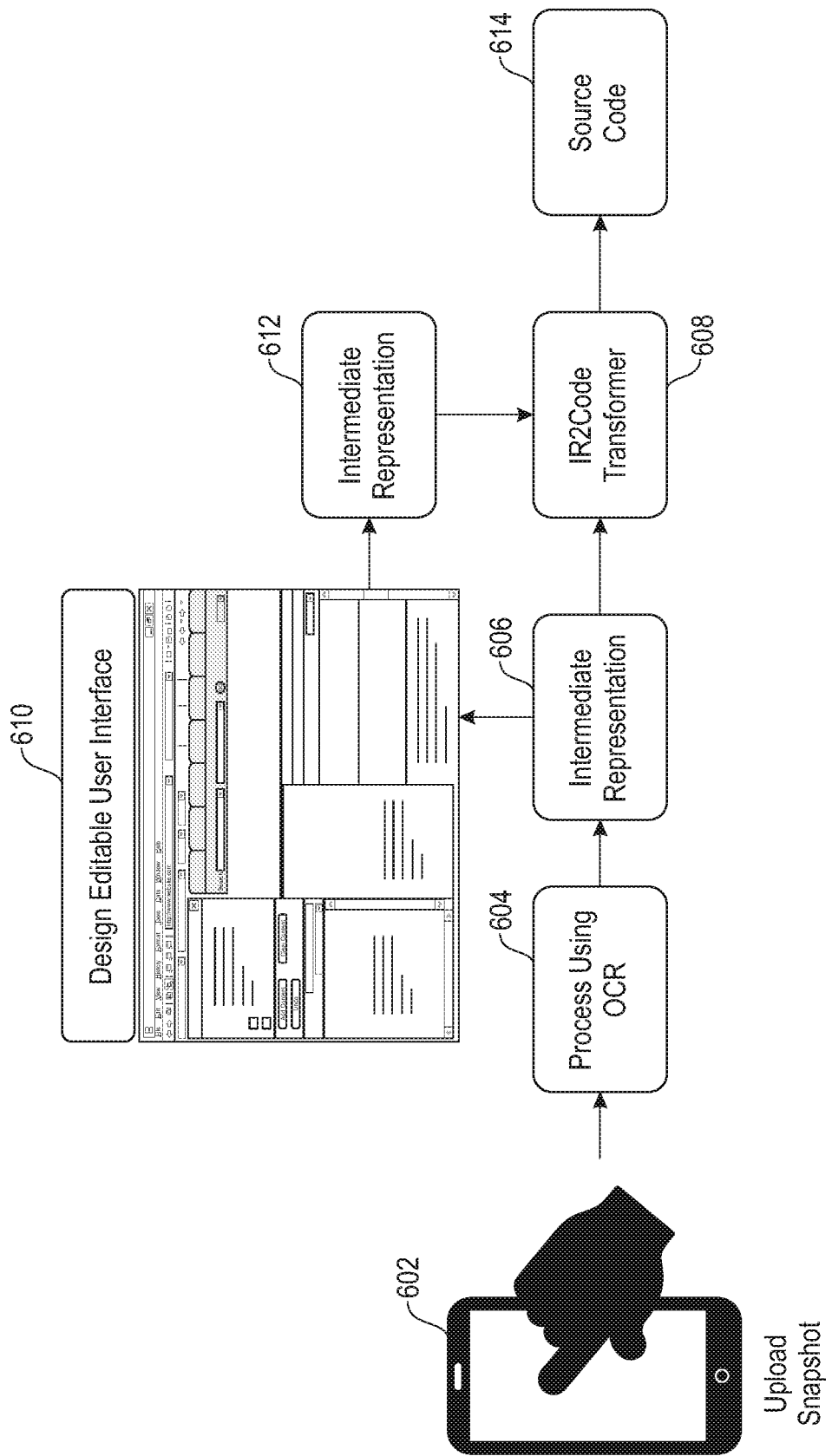
FIG. 6 is a diagram illustrating system architecture, according to an exemplary embodiment of the invention.

FIG. 6 is a diagram illustrating system architecture, according to an embodiment of the invention. By way of illustration, FIG. 6 depicts an uploaded snapshot 602 (that is, the image of a deep learning network design), which is processed using an OCR component 604 to generate a first intermediate representation 606. The first intermediate representation 606 is provided to a design editable UI 610, which then generates a second intermediate representation 612. Intermediate representations 606 and 612 are then provided to a code transformer 608, which generates source code 614. Intermediate representation 606 is the intermediate design obtained from the input image. That intermediate design is then converted into a user understandable GUI version via UI 610, where the user can edit the design. After any user edits, the updated information is again converted back to the intermediate representation, represented by 612 in FIG. 6.

Figure 7:
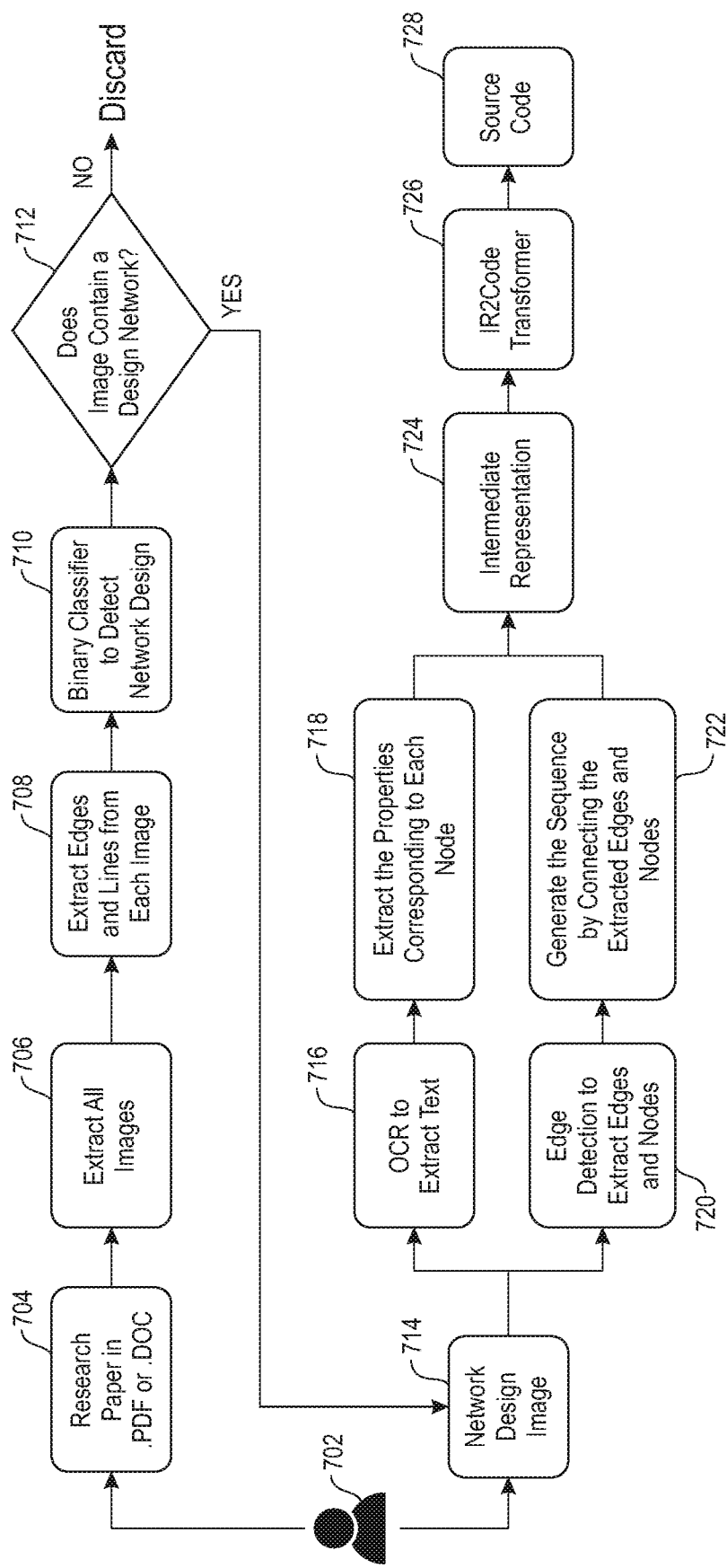
FIG. 7 is a diagram illustrating system architecture, according to an exemplary embodiment of the invention.

FIG. 7 is a diagram illustrating system architecture, according to an embodiment of the invention. By way of illustration, FIG. 7 depicts designing a deep learning network, including one or more parameters, using a network design image 714 derived from a research paper 704 provided by a user 702. Specifically, if, for example, a PDF or DOC format of the research paper 704 is provided, all of the images are extracted via step 706. Additionally, step 708 includes extracting edges and lines from each extracted images, and, using a binary classifier, step 710 includes detecting only the images that contain a network design for further processing. A supervised machine learning classifier is trained with labeled images (images containing the network design and images not containing the network design). The supervised binary machine learning classifier will determine if a new image contains a network design or not. If an image does not contain a network design image (as determined via step 712), the image is discarded. If an image does contain a network design image, that network design image 714 is utilized for further processing.

Step 716 includes using OCR to extract text from the network design image 714, and step 720 includes detecting one or more edges in the network design image 714 so as to extract edges and nodes from the image 714. Using the text extracted by OCR, one or more image properties corresponding to each node are extracted via step 718. As noted, from the design image, text is extracted using OCR. From the text, the layers (also referred to herein as the nodes) are extracted. The above-noted properties can include the parameters of each layer. Additionally, step 722 includes generating a sequence by connecting the extracted edges and nodes (from step 720). The outputs of steps 718 and 722 are then used to generate an intermediate representation 724, which is then provided to a code transformer 726 for the generation and outputting of source code 728.

Figure 8:
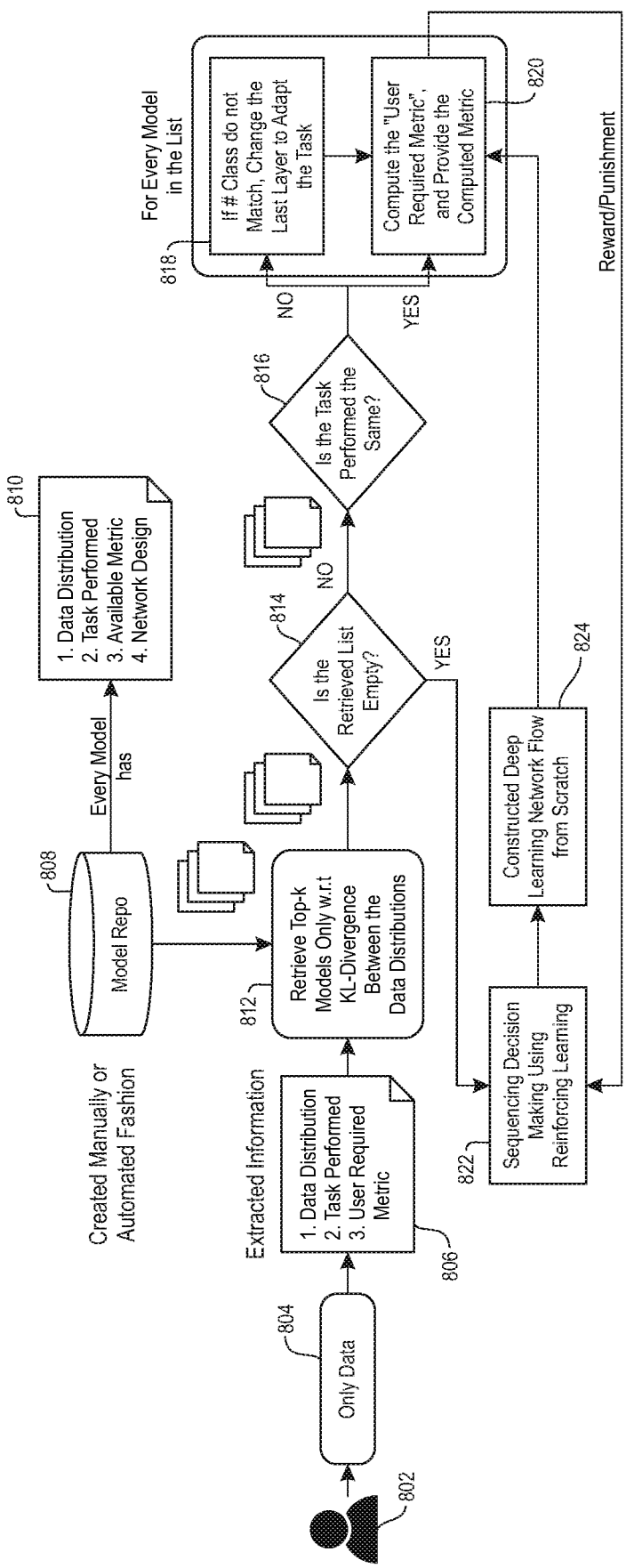
FIG. 8 is a diagram illustrating system architecture, according to an exemplary embodiment of the invention.

FIG. 8 is a diagram illustrating system architecture, according to an embodiment of the invention. By way of illustration, FIG. 8 depicts a dataset 804, provided by a user 802, from which information (such as data distribution, tasks performed, user-required metrics, etc.) is extracted in step 806. Based on such extracted information from the dataset, step 812 includes retrieving the closest fit models (for example, the top-k models) from a model repository 808 (which is created manually or automatically based on research papers and model mutations). Also, every model in the model repository can contain certain information 810 (such as data distribution, tasks performed, available metrics, network design, etc.). For example, input data can be fitted into a distribution such as a Gaussian distribution, and examples of tasks performed can include n-class classification, regression, etc. Also, a required metric can include accuracy, time taken, memory used, etc. Further, in one or more embodiments of the invention, the retrieving in step 812 can be carried out with respect to Kullback-Leibler (KL) divergence between the data distributions of the given dataset 804 and the models in the model repository 808.

As also depicted in FIG. 8, step 814 includes determining whether the list of retrieved models (via step 812) is empty. If no (that is the retrieved list is not empty), then step 816 includes determining whether the task(s) performed in the retrieved model(s) is/are the same as the task(s) performed in the given dataset 804. If no (that is, the task(s) performed is/are not the same), then, for every model in the retrieved list, step 818 includes changing the last layer of the model to adapt to the task of the dataset 804 if the number of classes do not match. For a classification task, the input data are classified into one of "n" different classes. By way of example, the last layer can have a number of nodes corresponding to the number of classes. Accordingly, if the number of classes changes (say, from 10 classes to a 100 class classification problem), then the last layer is changed to have 100 nodes.

Referring again to step 818, if yes (that is, the task(s) performed is/are the same), then, for every model in the retrieved list, step 820 includes computing the user-required metric (derived from the dataset 804) and outputting the computed metric to a reinforcement learning component in step 822.

If, in step 814, it is determined that the retrieved list is empty, then step 822 includes performing a sequential decision using the above-noted reinforcement learning component. The sequential decision includes deciding what layer comes after another in the deep learning network design. The output of step 822 is then used to construct a deep learning network flow in step 824, which provides an output to be used again in step 820 (computation of the user-required metric). Specifically, step 824 produces both the intermediate representation and the corresponding source code.

Figure 9:
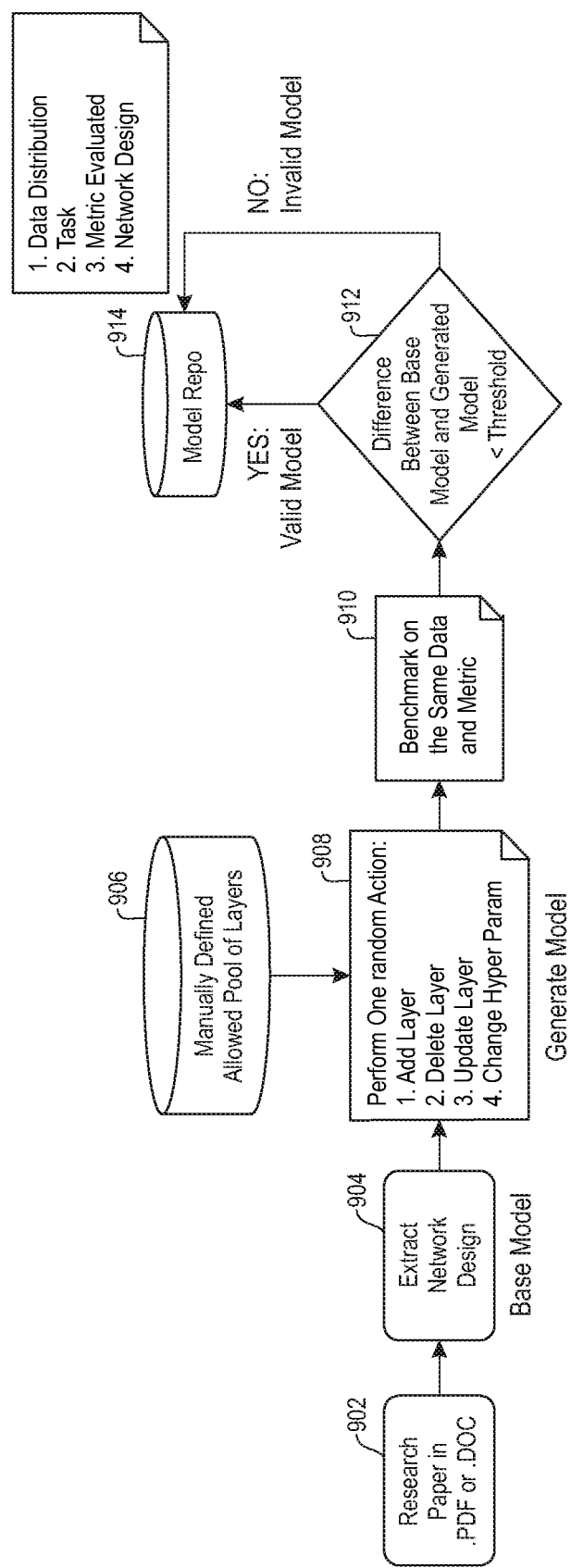
FIG. 9 is a diagram illustrating system architecture, according to an exemplary embodiment of the invention.

FIG. 9 is a diagram illustrating system architecture, according to an embodiment of the invention. By way of illustration, FIG. 9 depicts, in step 904, extracting a network design (which is to serve as the base model) from a research paper 902. FIG. 9 also depicts a manually defined repository 906 containing an allowed pool of layers. There is a subset of allowed layers from which a layer is chosen. This subset of allowed layers is termed the "allowed pool of layers." Based on inputs from the repository 906 and the base model generated in step 904, step 908 includes generating a model that includes the performance of at least one random action. Such actions can include, for example, adding one or more new layers from the manually defined pool of layers in repository 906 at a random position in the network design (base model). Such actions can additionally include deleting an existing layer at a random position in the network design (base model), and changing a random layer parameter of a random layer in the network design (base model). Further, such actions can also include updating a layer in the network design (base model), and, based on a manually defined set of hyper parameters, changing the value of a random hyper parameter in the network design (base model). Every layer can have two kinds of parameters: (i) parameters that are learnt via training data, and (ii) hyper parameters that are variables that are not learnt but fixed before training occurs.

Referring again to FIG. 9, the generated model output from step 908 can subsequently, in step 910, be benchmarked on the same data and the same metric as the base model. Additionally, step 912 includes determining whether the difference between the base model and the generated model is less than a pre-determined threshold amount. If no (that is, the base model and the generated model differ by greater than the threshold amount), the generated model is deemed invalid and a model repository 914 is updated accordingly. If yes (that is, the base model and the generated model differ by less than the threshold amount), the generated model is deemed valid and the model repository 914 is updated accordingly.

Figure 10:
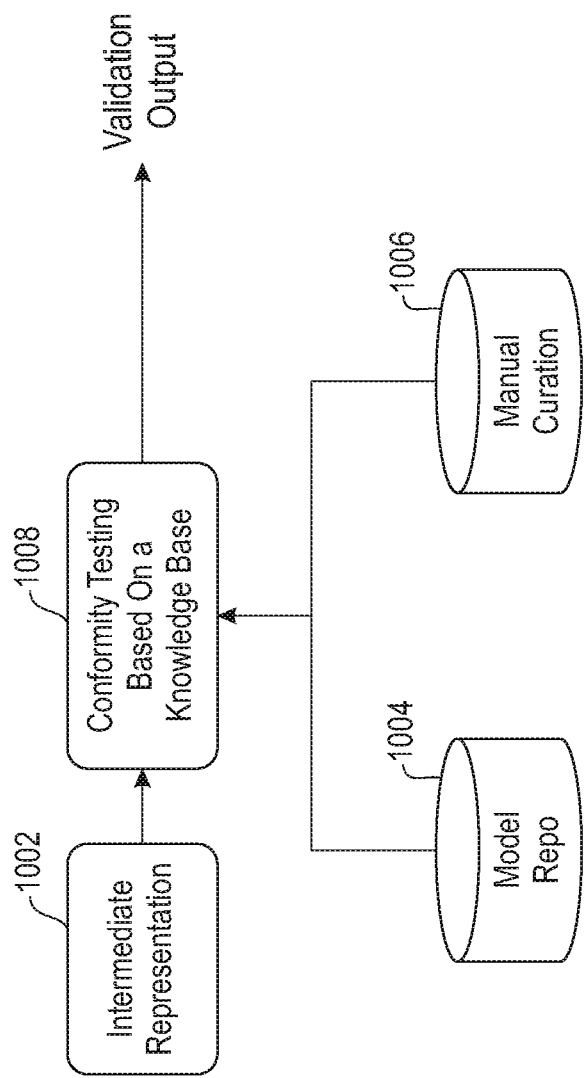
FIG. 10 is a diagram illustrating system architecture, according to an exemplary embodiment of the invention.

FIG. 10 is a diagram illustrating system architecture, according to an embodiment of the invention. By way of illustration, FIG. 10 depicts static design validation including, for example, whether correct layers are present in the design in the correct sequence. Specifically, FIG. 10 depicts an intermediate representation 1002, which is provided to a conformity testing component 1008 for validation. The conformity testing component 1008 is based on a knowledge base that derives inputs from a model repository 1004 and a manual curation database 1006. Based on an analysis of the provided intermediate representation 1002, the conformity testing component 1008 generates and outputs a validation output. Such an output can include, for example, a suggestion to add, delete, and/or swap layers in the design.

Figure 11:
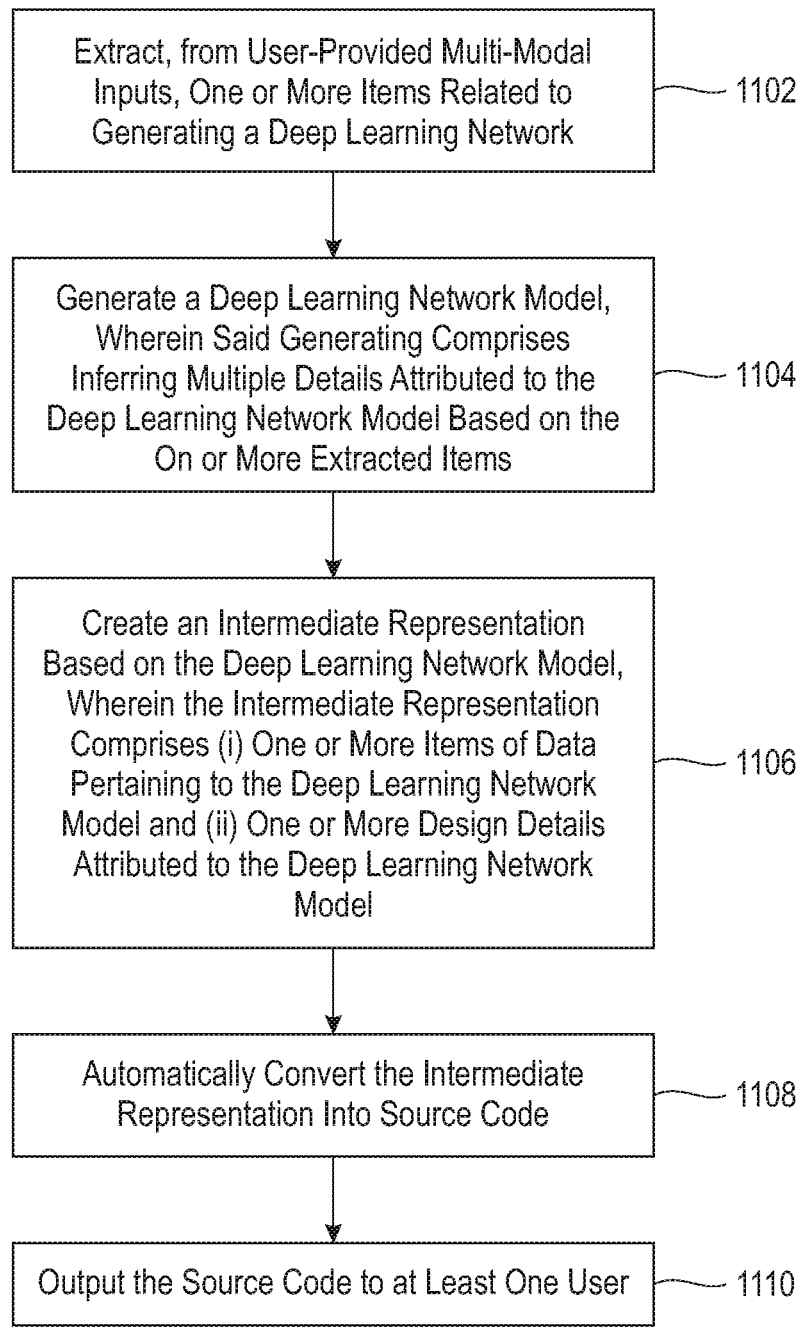
FIG. 11 is a flow diagram illustrating techniques according to an embodiment of the invention.

FIG. 11 is a flow diagram illustrating techniques according to an embodiment of the present invention. Step 1102 includes extracting, from user-provided multi-modal inputs, one or more items related to generating a deep learning network. In one or more embodiments of the invention, the user-provided multi-modal inputs can include one or more items of natural language conversation data, and extracting can include employing a knowledge graph to disambiguate one or more user intentions from the one or more items of natural language conversation data. Additionally, user-provided multi-modal inputs can include input source code written in any deep learning framework, an image of a deep learning network design (wherein the network design image is automatically extracted from a research paper), a user-provided dataset, and/or one or more inputs provided by the user via a drag-and-drop user interface.

Step 1104 includes generating a deep learning network model, wherein said generating comprises inferring multiple details attributed to the deep learning network model based on the one or more extracted items. Generating the deep learning network model can include retrieving a similar pre-existing deep learning network model from a repository based on a comparison of (i) the one or more extracted items from the user-provided inputs and (ii) multiple deep learning network models stored in the repository. Additionally, one or more embodiments of the invention can include adapting the retrieved pre-existing deep learning network to the one or more user-provided inputs.

Step 1106 includes creating an intermediate representation based on the deep learning network model, wherein the intermediate representation comprises (i) one or more items of data pertaining to the deep learning network model and (ii) one or more design details attributed to the deep learning network model. Step 1108 includes automatically converting the intermediate representation into source code. Step 1110 includes outputting the source code to at least one user.

The techniques depicted in FIG. 11 can also include automatically performing a static validation of the deep learning network model. The static validation can include determining whether one or more pre-determined layers are present in the deep learning network model, and/or determining whether multiple pre-determined layers are present, in a pre-determined sequence, in the deep learning network model. Additionally, one or more embodiments of the invention can include generating a suggestion to add one or more layers in the deep learning network model based on said static validation, generating a suggestion to delete one or more layers in the deep learning network model based on said static validation, and/or generating a suggestion to swap one or more layers in the deep learning network model based on said static validation.

Also, an additional embodiment of the invention can include creating a repository of multiple deep learning network models, retrieving a similar pre-existing deep learning network model from a repository based on a comparison of the one or more extracted items and the multiple deep learning network models stored in the repository, and creating an intermediate representation by adapting the retrieved pre-existing deep learning network to the user-provided multi-modal inputs, wherein the intermediate representation comprises (i) one or more items of data pertaining to the deep learning network model and (ii) one or more design details attributed to the deep learning network model.

At least one embodiment of the invention (such as the techniques depicted in FIG. 11, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives input information sent from a data source to the transmission server. The server can process the information, for example, based upon user-provided user preference information that is stored in memory on the server. Subsequently, an alert is generated containing execution-ready source code for deep learning model generation. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 11 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 11 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 12:
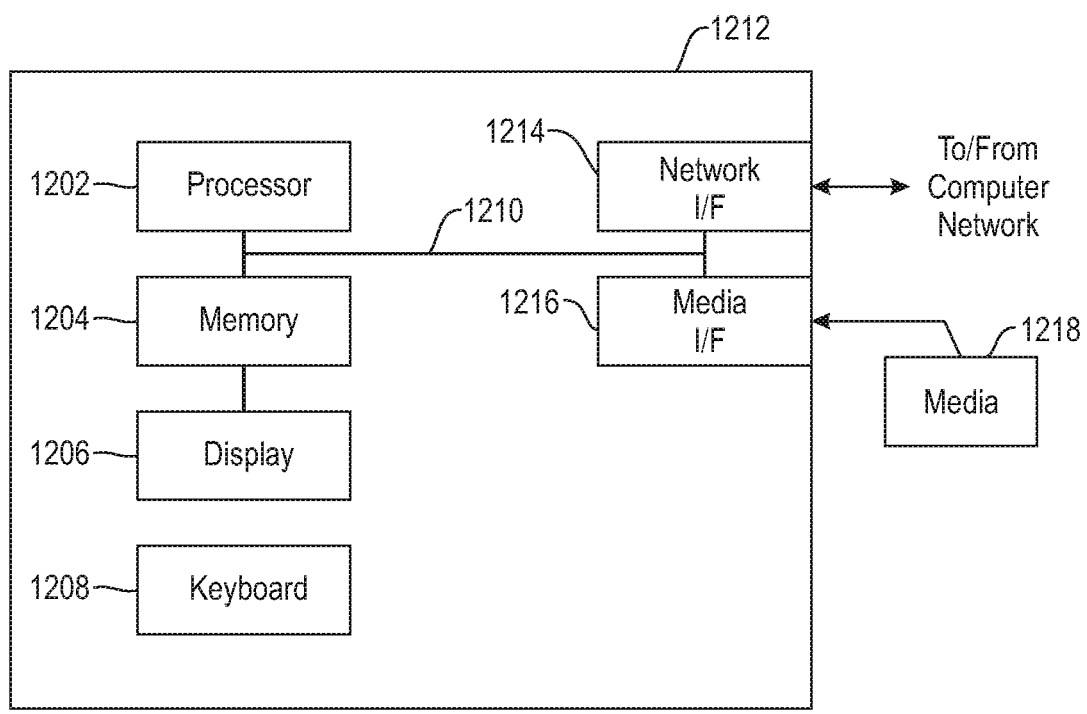
FIG. 12 is a system diagram of an exemplary computer system on which at least one embodiment of the invention can be implemented.

Additionally, an embodiment of the present invention can make use of software running on a computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1202. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
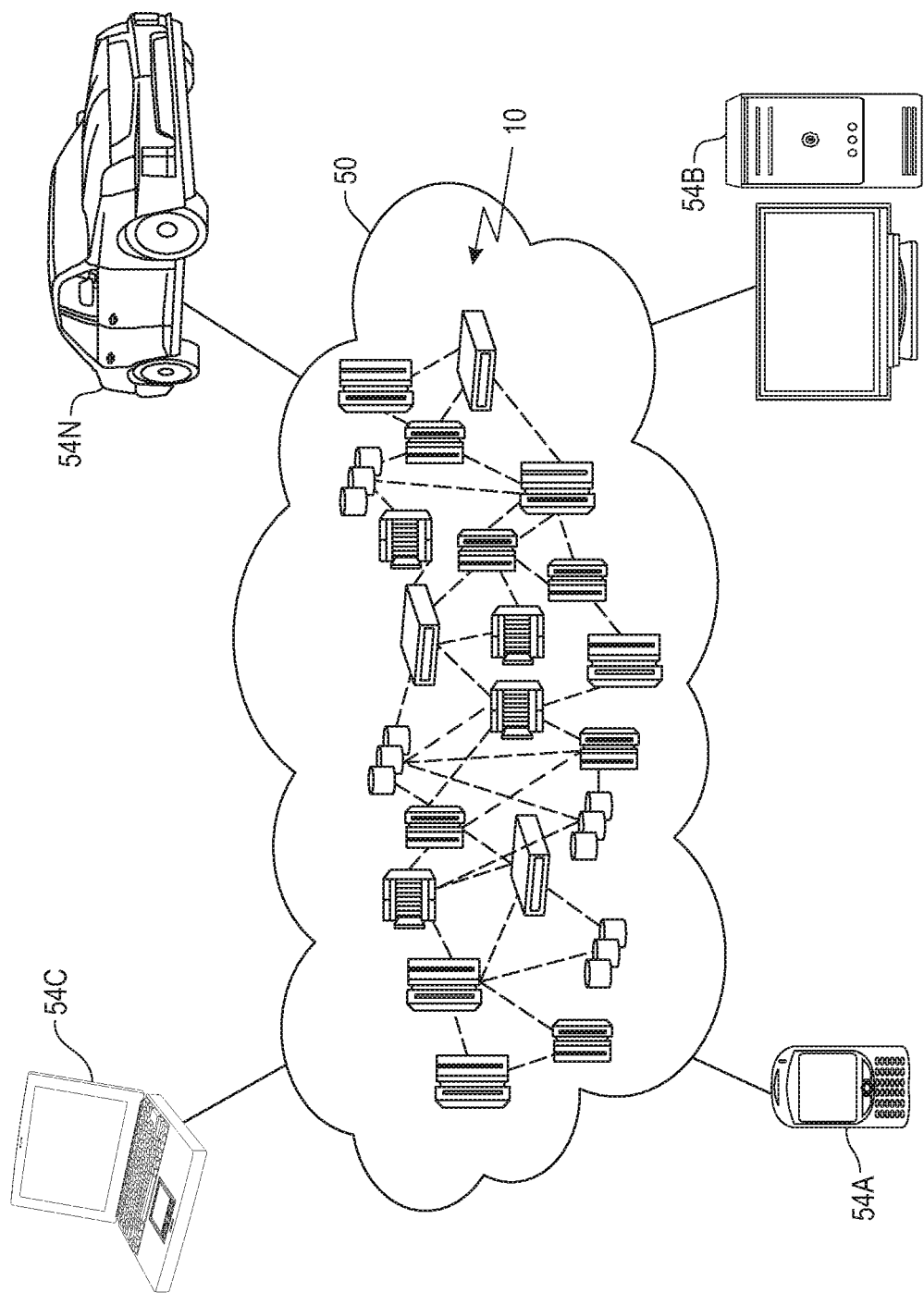
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
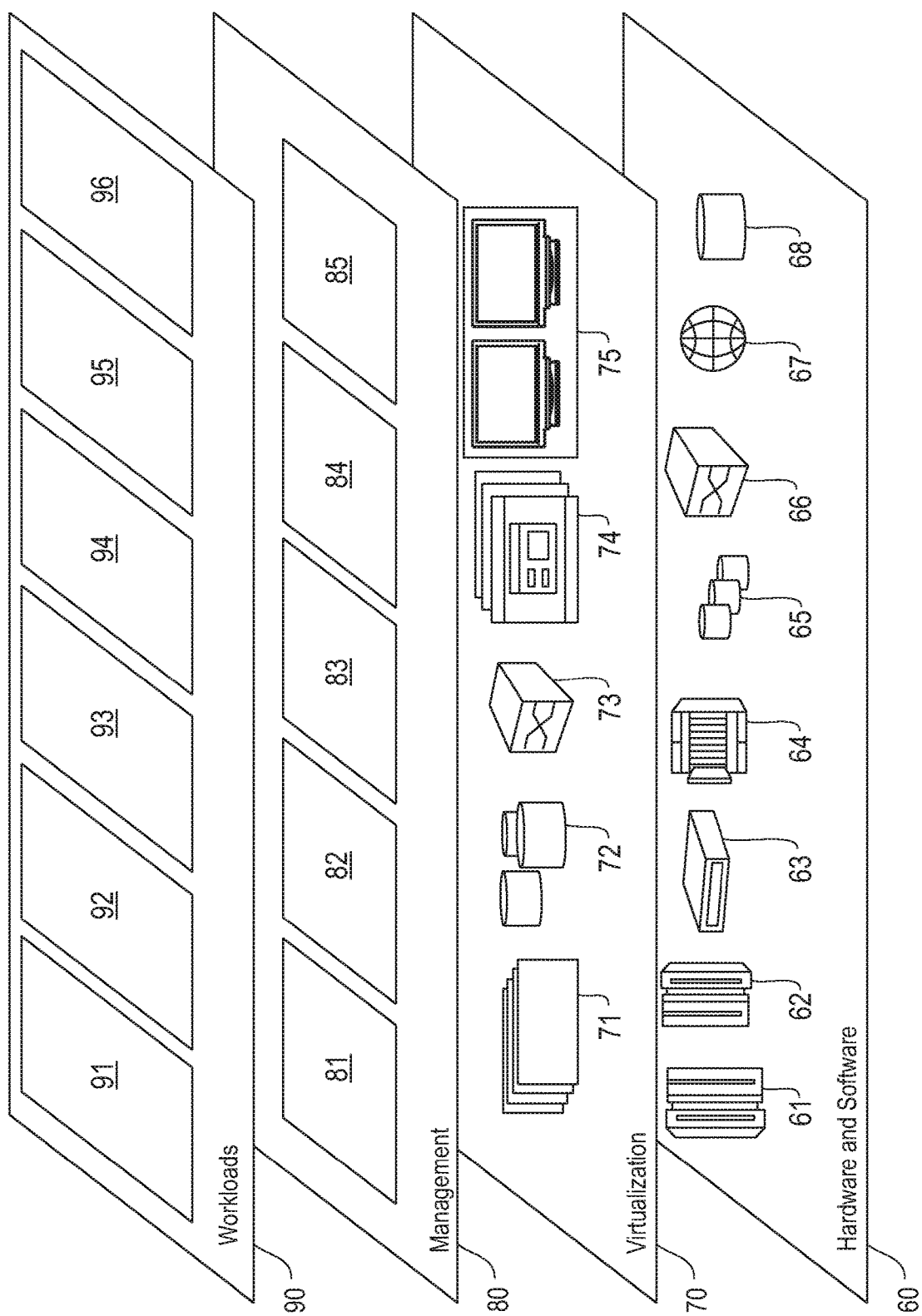
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deep learning network construction 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically building a deep learning model from inputs such as images, natural language data, source code, research papers, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating source code for a deep learning network, comprising:

extracting, from user-provided multi-modal inputs, one or more items related to generating a deep learning network model, wherein the one or more extracted items comprise an image of a deep learning network design and a classification task to be performed by the deep learning network model;

processing the image to extract information comprising at least one of: text from the image using an optical character recognition process; and edges and nodes from the image using an edge detection process;

retrieving a similar pre-existing deep learning network model, created using deep learning source code corresponding to a first library language, from a repository based at least in part on a comparison of: the information extracted from the image of the deep learning network design; and multiple deep learning network models stored in the repository;

adapting the retrieved pre-existing deep learning network model to the one or more multi-model inputs to generate the deep learning network model, wherein said adapting comprises: changing a last layer in the pre-existing deep learning network model to have a number of nodes corresponding to a number of classes associated with the classification task to be performed by the deep learning network model; and re-training and updating one or more parameters of the retrieved pre-existing deep learning network model;

creating an intermediate representation of the deep learning network model, wherein the intermediate representation comprises: one or more items of data pertaining to the deep learning network model; and one or more design details attributed to the deep learning network model;

automatically converting the intermediate representation into source code corresponding to a second library language that is different than the first library language;

automatically performing a static validation of the deep learning source code to determine whether one or more specified network layers are present in the generated deep learning network model; and outputting the deep learning source code corresponding to the second library language to at least one user;

wherein the steps are carried out by at least one computing device.

2. The computer-implemented method of claim 1, wherein the user-provided multi-modal inputs comprise one or more items of natural language conversation data.

3. The computer-implemented method of claim 2, wherein said extracting comprises employing a knowledge graph to disambiguate one or more user intentions from the one or more items of natural language conversation data.

4. The computer-implemented method of claim 1, wherein the user-provided multi-modal inputs comprise input source code written in a deep learning framework.

5. The computer-implemented method of claim 1, wherein the deep learning network design image is automatically extracted from a research paper.

6. The computer-implemented method of claim 1, wherein the user-provided multi-modal inputs comprise a user-provided dataset.

7. The computer-implemented method of claim 1, wherein the user-provided multi-modal inputs comprise one or more inputs provided by the user via a drag-and-drop user interface.

8. The computer-implemented method of claim 1, wherein the static validation comprises determining whether multiple pre-determined layers are present, in a pre-determined sequence, in the deep learning network model.

9. The computer-implemented method of claim 1, comprising:
generating a suggestion to add one or more layers in the deep learning network model based on said static validation.

10. The computer-implemented method of claim 1, comprising:
generating a suggestion to delete one or more layers in the deep learning network model based on said static validation.

11. The computer-implemented method of claim 1, comprising:
generating a suggestion to swap one or more layers in the deep learning network model based on said static validation.

12. The computer-implemented method of claim 5, wherein the research paper is provided as input by the at least one user, and wherein automatically extracting the image of the deep learning network design comprises:
extracting a candidate image from the research paper;
extracting edges and lines from the candidate image; and
applying a binary classifier to the extracted edges and lines to determine that the candidate image comprises the deep learning network design.

13. A computer program product comprising a computer readable storage medium having program instructions embodied therewith, the program instructions executable by a device to cause the device to:
extract, from user-provided multi-modal inputs, one or more items related to generating a deep learning network model, wherein the one or more extracted items comprise an image of a deep learning network design and a classification task to be performed by the deep learning network model;
process the image to extract information comprising at least one of: text from the image using an optical character recognition process; and edges and nodes from the image using an edge detection process;
retrieve a similar pre-existing deep learning network model, created using deep learning source code corresponding to a first library language, from a repository based at least in part on a comparison of: the information extracted from the image of the deep learning network design; and multiple deep learning network models stored in the repository;
adapt the retrieved pre-existing deep learning network model to the one or more multi-model inputs to generate the deep learning network model, wherein said adapting comprises: changing a last layer in the pre-existing deep learning network model to have a number of nodes corresponding to a number of classes associated with the classification task to be performed by the deep learning network model; and re-training and updating one or more parameters of the retrieved pre-existing deep learning network model;
create an intermediate representation of the deep learning network model, wherein the intermediate representation comprises: one or more items of data pertaining to the deep learning network model; and one or more design details attributed to the deep learning network model;
automatically convert the intermediate representation into source code corresponding to a second library language that is different than the first library language;
automatically perform a static validation of the deep learning source code to determine whether one or more specified network layers are present in the generated deep learning network model; and
output the deep learning source code corresponding to the second library language to at least one user.

14. The computer program product of claim 13, wherein the user-provided multi-modal inputs comprise one or more items of natural language conversation data.

15. A system comprising:
a memory configured to store program instructions; and
at least one processor operably coupled to the memory to execute the program instructions to:
extract, from user-provided multi-modal inputs, one or more items related to generating a deep learning network model, wherein the one or more extracted items comprise an image of a deep learning network design and a classification task to be performed by the deep learning network model;
process the image to extract information comprising at least one of: text from the image using an optical character recognition process; and edges and nodes from the image using an edge detection process;
retrieve a similar pre-existing deep learning network model, created using deep learning source code corresponding to a first library language, from a repository based at least in part on a comparison of: the information extracted from the image of the deep learning network design; and multiple deep learning network models stored in the repository;
adapt the retrieved pre-existing deep learning network model to the one or more multi-model inputs to generate the deep learning network model, wherein said adapting comprises: changing a last layer in the pre-existing deep learning network model to have a number of nodes corresponding to a number of classes associated with the classification task to be performed by the deep learning network model; and re-training and updating one or more parameters of the retrieved pre-existing deep learning network model;
create an intermediate representation of the deep learning network model, wherein the intermediate representation comprises: one or more items of data pertaining to the deep learning network model; and one or more design details attributed to the deep learning network model;
automatically convert the intermediate representation into source code corresponding to a second library language that is different than the first library language;
automatically perform a static validation of the deep learning source code to determine whether one or more specified network layers are present in the generated deep learning network model; and
output the deep learning source code corresponding to the second library language to at least one user.

16. The system of claim 15, wherein the static validation comprises determining whether multiple pre-determined layers are present, in a pre-determined sequence, in the deep learning network model.

17. The system of claim 15, wherein the user-provided multi-modal inputs comprise one or more items of natural language conversation data.

18. The system of claim 15, wherein said extracting comprises employing a knowledge graph to disambiguate one or more user intentions from the one or more items of natural language conversation data.

19. The system of claim 15, wherein the user-provided multi-modal inputs comprise input source code written in a deep learning framework.

20. A computer-implemented method for generating source code for a deep learning network, comprising:
creating a repository of multiple deep learning network models;
extracting, from user-provided multi-modal inputs, one or more items related to generating a deep learning network model, wherein the one or more extracted items comprise an image of a deep learning network design and a classification task to be performed by the deep learning network model;
processing the image to extract information comprising at least one of: text from the image using an optical character recognition process; and edges and nodes from the image using an edge detection process;
retrieving a similar pre-existing deep learning network model, created using deep learning source code corresponding to a first library language, from the repository based at least in part on a comparison of: the information extracted from the image of the deep learning network design; and the multiple deep learning network models stored in the repository;
adapting the retrieved pre-existing deep learning network model to the one or more user-provided inputs to generate the deep learning network model, wherein said adapting comprises: changing a last layer in the pre-existing deep learning network model to have a number of nodes corresponding to a number of classes associated with the classification task to be performed by the deep learning network model; and re-training and updating one or more parameters of the retrieved pre-existing deep learning network model;
creating an intermediate representation of the deep learning network model, wherein the intermediate representation comprises: one or more items of data pertaining to the deep learning network model; and one or more design details attributed to the deep learning network model;
automatically converting the intermediate representation into source code corresponding to a second library language that is different than the first library language; and
outputting the deep learning source code corresponding to the second library language to at least one user.

* * * * *